N. WHITEHALL.
Wheel Cultivator.
No. 18,530.
Patented Oct. 27, 1857.
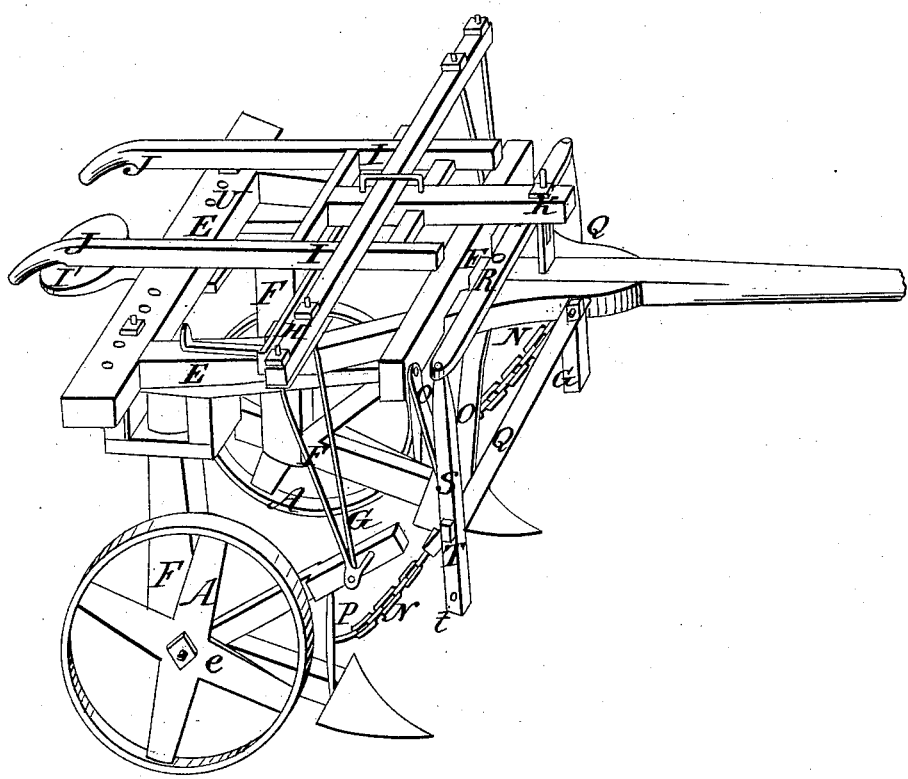
Witnesses:
Thos. H. McHeren
A. Colvert.
Inventor:
Nicholas Whitehall.

UNITED STATES PATENT OFFICE.

NICHOLAS WHITEHALL, OF ROB ROY, INDIANA, ASSIGNOR TO N. WHITEHALL AND A. L. WHITEHALL.

IMPROVEMENT IN CULTIVATORS.

Specification forming part of Letters Patent No. 18,530, dated October 27, 1857.

*To all whom it may concern:*

Be it known that I, NICHOLAS WHITEHALL, of Rob Roy, in the county of Fountain and State of Indiana, have invented certain new and useful Improvements in Cultivators for Farm Use, of which the following description, illustrated by the accompanying drawing and references, is sufficiently clear and comprehensive to enable persons of competent skill to make and use my invention.

My invention consists in providing a double cultivator, the middle of which is elevated to pass over the rows of corn, with a compound evener so constructed that while the balance-bar is placed high enough to clear the corn the point of attachment for the single whiffletrees may be sufficiently low to give an easy draft for the animals, as hereinafter more fully set forth.

The object which I desire to accomplish in the construction of this cultivator is to fit it for plowing both sides of a row of corn or vegetables at the same time, even after having grown to considerable height, using two horses to do the work, the frame-work, evener, &c., being arched from side to side to pass over the corn.

The drawing is a perspective view of my improved cultivator.

A are the wheels, attached by a pin, $e$, to the sides of the swing frames or shanks F, hung to the main frame E, with a stirrup, G, attached to the arm H. This stirrup is a fixed brace-stirrup, and, being operated laterally by the swing operating-frame I, carries with it the plows and their attachments as far as desired by the driver or operator. The driver's station is upon the seat I. The frame is moved by the handles J, and turns upon the center K.

E is the main frame, which supports all the other parts, as represented.

The chain N, from the braces O to the brace P, gives strength to the plow-frame and still permits it to receive the lateral motion above described.

The compound evener is formed of three parts or levers, Q R S, R lying horizontally upon the top of the tongue, and Q S being attached to the ends of R, as shown, with a central fulcrum at T, below which, at $t$, the power is applied by the use of two ordinary single whiffletrees. The said lever R, being free to move upon its central fulcrum, gives an evening or balancing power to the single whiffletrees. The object of this arrangement is to carry the double whiffletrees over the top of the corn while the horses are between the rows upon each side of it.

U U are for the purpose of arranging the plows closer together or farther apart in case it is desired they may be set sufficiently distant for crossing out or marking ground.

Another and very important object gained in the arrangement above described over the particular arrangement described in a patent bearing date the 3d day of July, 1855, granted to N. Whitehall, is that the plows are attached so near the center of the wheel that the length of the cultivator may be much shorter, and thus rendered far more convenient for use.

Another advantage is that as the direction of the wheel's track is changed the plows are more easily guided, as the wheel naturally carries the plow with it.

I claim—

Providing a double cultivator, the middle of which is elevated to pass over the corn, with a compound evener suspended upon three points, and arranged as described, for the purpose set forth.

NICHOLAS WHITEHALL.

Witnesses:
 THOS. E. MCPHERSON,
 A. COLVERT.